United States Patent
Miyagi

(10) Patent No.: US 7,221,523 B2
(45) Date of Patent: May 22, 2007

(54) OPTICAL PICKUP AND OPTICAL DISK DEVICE

(75) Inventor: Takahiro Miyagi, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/563,159

(22) PCT Filed: May 13, 2005

(86) PCT No.: PCT/JP2005/008786

§ 371 (c)(1),
(2), (4) Date: Jan. 4, 2006

(87) PCT Pub. No.: WO2005/112012

PCT Pub. Date: Nov. 24, 2005

(65) Prior Publication Data

US 2006/0181970 A1    Aug. 17, 2006

(30) Foreign Application Priority Data

May 14, 2004  (JP)  ............... 2004-145482
Oct. 27, 2004  (JP)  ............... 2004-311892

(51) Int. Cl.
  *G02B 7/02*  (2006.01)
  *G11B 7/00*  (2006.01)
(52) U.S. Cl. .................. 359/819; 359/822; 359/823; 369/44.11
(58) Field of Classification Search .......... 359/819, 359/821, 822, 823, 824, 811, 813, 814; 369/112, 369/44.15, 44.16, 44.11, 44.14
See application file for complete search history.

(56) References Cited

FOREIGN PATENT DOCUMENTS

| JP | 64-52233 | 2/1989 |
|---|---|---|
| JP | 5-128559 | 5/1993 |
| JP | 8-221776 | 8/1996 |
| JP | 9-35304 | 2/1997 |
| JP | 11-120587 | 4/1997 |
| JP | 11-66587 | 3/1999 |
| JP | 2000-113477 | 4/2000 |
| JP | 2001-93178 | 4/2001 |
| JP | 2001-273659 | 10/2001 |
| JP | 2002-150584 | 5/2002 |
| JP | 2003-168230 | 6/2003 |

*Primary Examiner*—Ricky Mack
*Assistant Examiner*—Brandi Thomas
(74) *Attorney, Agent, or Firm*—Oblon, Spivak, McClelland, Maier & Neustadt, P.C.

(57) ABSTRACT

The present invention is directed to an optical pick-up adapted for moving an object lens (7) supported by a lens holder (2) in a focus direction in parallel to the optical axis direction thereof and in a tracking direction perpendicular to the focus direction, and for performing control of tilt angle serving to tilt the optical axis of the object lens following inclination of an optical disc. At the lens holder, there are provided a pair of focus coils (20) and a pair of tracking coils (30). The pair of focus coils have coil surfaces which are perpendicular to winding axes of coil portions constituting the respective focus coils and face magnets, and are so attached to the lens holder as to face the tangential direction with the object lens put therebetween, the pair of focus coils being shifted in left and right directions respectively away from a virtual axis which is perpendicular to the tracking direction and passes along the optical axis of the object lens, the coil surfaces being directed toward the tangential direction. By changing a drive force produced at the pair of focus coil portions, tilt angle of the object lens is controlled.

17 Claims, 9 Drawing Sheets

OPTICAL PICKUP AND OPTICAL DISK DEVICE

TECHNICAL FIELD

The present invention relates to an optical pick-up used for performing recording of information signals onto an optical disc and for performing reproduction of information signals recorded on an optical disc, and an optical disc apparatus using such an optical pick-up.

This application claims priority of Japanese Patent Application No. 2004-145482, filed on May 14, 2004, and Japanese Patent Application No. 2004-311892, filed on Oct. 27, 2004, the entireties of which are incorporated by reference herein.

Hitherto, as recording media for information signals, there are used optical discs such as CD (Compact Disc) or DVD (Digital Versatile Disc), etc. In order to perform recording of information signals onto an optical disc, and to perform reproduction of information signals recorded on an optical disc, there is used an optical pick-up.

Such optical pick-up comprises a biaxial actuator for moving an object lens in a focus direction which is the optical axis direction thereof in order to allow light beams emitted from a light source to be in-focus state onto the recording surface of the optical disc, and for moving the object lens in a tracking direction at plane surface direction perpendicular to the optical axis in order to allow light beams to follow recording tracks provided at the optical disc.

In recent years, with realization of high recording density of optical discs, it is required to allow the shape of light spot formed on the recording surface of the optical disc to be precise circular. It is more important to conduct a control so as to allow the optical axis of the object lens to be perpendicular to the recording surface of the optical disc. For this reason, there is proposed an optical pick-up comprising a triaxial actuator including, in addition to biaxial actuator for focus and tracking, an actuator dedicated for tilt angle control to incline or tilt the optical axis of the object lens in a manner following inclination of the optical disc.

In such optical pick-up comprising triaxial actuator, since actuator dedicated for tilt angle control is required, the number of parts is increased. This is disadvantageous to realization of miniaturization. A drive signal for driving the dedicated actuator is required. This is disadvantageous to reduction of power consumption.

On the other hand, there is also proposed an optical pick-up caused to be of the configuration in which strength and/or mechanical characteristic of the supporting mechanism for supporting the lens holder are caused to be unbalanced to tilt the lens holder in accordance with displacement quantity in the focus direction of the lens holder to change tilt angle. As the optical pick-up of this kind, there is an optical pick-up described in the Japanese Patent Application Laid Open No. 2001-319353 publication.

In the optical pick-up, since it is necessary to suppress unnecessary inclination (skew) of the lens holder taking place when the lens holder is moved in the focus direction and in the tracking direction, high accuracy is required for structural or mechanical parts (components) for supporting the lens and assembling of theses structural or mechanical parts. This is disadvantageous to reduction of parts cost and/or assembling cost.

DISCLOSURE OF THE INVENTION

Problems to be Solved by the Invention

An object of the present invention is to provide an optical pick-up which solves the problems that conventionally proposed optical pick-up devices as described above have, which realizes miniaturization and is advantageous to reduction of power consumption, and which is advantageous to reduction of parts costs and/or assembling cost, and an optical disc apparatus using such an optical pick-up.

The optical pick-up to which the present invention is applied comprises: a lens holder for supporting an object lens; a supporting block disposed in a tangential direction perpendicular to a focus direction which is parallel to the optical axis direction of the object lens with a space provided between the supporting block and the lens holder; supporting arms for connecting the lens holder and the supporting block to movably support the lens holder in the focus direction and in a tracking direction with respect to the supporting block; a pair of focus coils which are attached to the lens holder and supplied with drive current to move the lens holder in the focus direction; and magnets which are supported by a yoke and face the pair of focus coils respectively. The pair of focus coils of the optical pick-up have coil surfaces which are perpendicular to winding axes of the respective focus coils and face the magnets, and are so attached to the lens holder as to face the tangential direction with the object lens put therebetween, the pair of focus coils being shifted in left and right directions respectively away from a virtual axis which is perpendicular to the tracking direction and passes along the optical axis of the object lens, the coil surfaces being directed toward the tangential direction.

The optical pick-up according to the present invention further comprises a pair of tracking coils which are so attached to the lens holder as to face the magnets and supplied with drive current to move the lens holder in the tracking direction. The pair of tracking coils have coil surfaces which are perpendicular to winding axes of the respective tracking coils and face the magnets, and are so attached to the lens holder as to face the tangential direction in parallel to the focus coils with the object lens put therebetween, the pair of tracking coils being shifted in left and right directions respectively away from the virtual axis which is perpendicular to the tracking direction and passes along the optical axis of the object lens, the coil surfaces being directed toward the tangential direction.

In the optical pick-up to which the present invention is applied, magnet facing to the focus coil and the tracking coil which are attached in parallel to one surface sides opposite to each other of the lens holder, and magnet facing to the focus coil and the tracking coil which are attached in parallel to the other surface sides opposite to each other of the lens holder are respectively constituted by integrated magnets.

These magnets are magnetized so that the plane surface facing to one sides opposite to each other in the optical axis direction of the object lens of the focus coil formed so as to have rectangular shape and plane surface facing to the other sides thereof have poles different from each other, and are magnetized so that the plane surface facing to one sides opposite to each other in the tracking direction of the tracking coil formed so as to have rectangular shape and plane surface facing to the other sides thereof have poles different from each other.

Moreover, the present invention is directed to an optical disc apparatus including a drive mechanism for holding and rotationally driving an optical disc, and an optical pick-up for irradiating light beams serving to record or reproduce information signals for the optical disc which is rotationally driven by the drive mechanism, and for detecting reflected light beams reflected from the optical disc, wherein the optical pick-up used in the optical disc apparatus comprise: a lens holder for supporting an object lens, a supporting block disposed in a tangential direction perpendicular to a focus direction which is parallel to the optical axis direction of the object lens with a space provided between the supporting block and the lens holder; supporting arms for connecting the lens holder and the supporting block to movably support the lens holder in the focus direction and in a tracking direction with respect to the supporting block; a pair of focus coils which are attached to the lens holder and supplied with drive current to move the lens holder in the focus direction; and magnets which are supported by a yoke and face the pair of focus coils respectively. The pair of focus coils of the optical pick-up have coil surfaces which are perpendicular to winding axes of the respective focus coils and face the magnets, and are so attached to the lens holder as to face the tangential direction with the object lens put therebetween, the pair of focus coils being shifted in left and right directions respectively away from a virtual axis which is perpendicular to the tracking direction and passes along the optical axis of the object lens, the coil surfaces being directed toward being the tangential direction.

In the optical pick-up and the optical disc apparatus to which the present invention is applied, since the pair of focus coils are so attached to the lens holder so as to face the tangential direction with the object lens put therebetween, the pair of focus coils being shifted in left and right directions respectively away from the virtual axis which is perpendicular to the tracking direction and passes along the optical axis of the object lens, the coil surfaces being toward the tangential direction, the magnitude of drive current delivered to the pair of focus coils is adjusted to produce difference in a force in the focus direction exerted on the respective forcus coils. Thus, it is possible to move the lens holder in a direction where the tilt angle is changed.

Accordingly, in the optical pick-up and the optical disc apparatus according to the present invention, since the actuator dedicated for tilt angle control becomes unnecessary, the number of parts can be reduced and miniaturization can be realized. Further, since drive current delivered to the actuator dedicated for tilt angle control becomes unnecessary, reduction of power consumption can be realized.

In addition, in the optical pick-up and the optical disc apparatus according to the present invention, since there is not employed a configuration in which the strength and/or the mechanical characteristic of the supporting mechanism for supporting the lens holder are caused to be unbalanced, unnecessary inclination becomes difficult to take place in the lens holder when the lens holder is moved in the focus direction and in the tracking direction. Accordingly, high accuracy is not required for structural or mechanical parts for supporting the lens holder and assembling of these structural or mechanical parts. Thus, the parts cost and the assembling cost can be reduced.

Still more further objects of the present invention and practical merits obtained by the present invention will become more apparent from the embodiments which will be given below with reference to the attached drawings.

BEST MODE FOR CARRYING OUT THE INVENTION

Initially, a first embodiment of an optical pick-up according to the present invention and an optical disc apparatus using such an optical pick-up will be explained.

Figure 1:
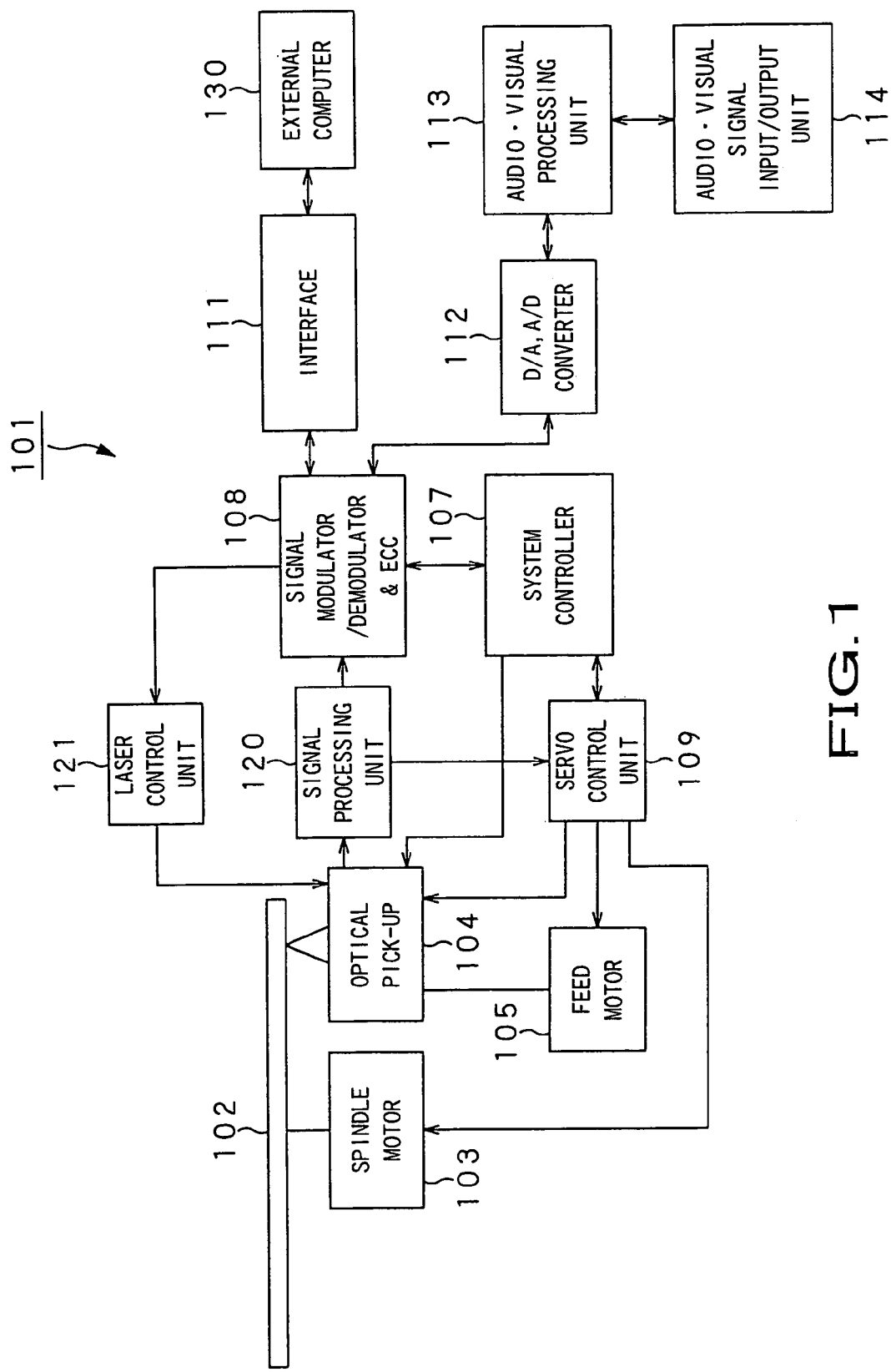
FIG. 1 is a block diagram showing a first embodiment of an optical disc apparatus in which an optical pick-up according to the presentn invention is assembled.

The optical disc apparatus in which the optical pick-up to which the present invention is applied is assembled has a configuration as shown in FIG. 1.

The optical disc apparatus 101 to which the present invention is applied comprises, as shown in FIG. 1, a spindle motor 103 serving as drive means for rotationally driving an optical disc 102 as a light recording medium such as CD-R, DVD±R, DVD-RAM, etc., an optical pick-up 104, and a feed motor 105 serving as drive means for driving the optical pick-up 104 in the radial direction thereof. Here, the spindle motor 103 is controlled so that it is driven at a predetermined number of rotations by a system controller 107 and a servo control unit 109.

A signal modulating/demodulating unit (modulator/demodulator) and ECC block 108 performs modulation/demodulation of signals outputted from a signal processing unit 120 and addition of ECC (Error Correction Code). The optical pick-up 104 serves to irradiate light beams with respect to the signal recording surface of the optical disc 102 rotated in accordance with command from the system controller 107 and the servo control unit 109. By such irradiation of light beams, recording of information signals with respect to the optical disc 102 is performed, and reproduction of information signals recorded on the optical disc is performed.

Moreover, the optical pick-up 104 is caused to be of the configuration to detect, on the basis of reflected light beams reflected from the signal recording surface of the optical disc 102, various light beams as described later to deliver detection signals obtained from respective light beams to the signal processing unit 120.

The signal processing unit 120 serves to generate various servo signals, i.e., a focus error signal and a tracking error signal on the basis of detection signals obtained by detecting respective light beams, and to generate a RF signal which is an information signal recorded on the optical disc. Moreover, in accordance with kind of recording media to be reproduced, predetermined processing such as demodulation and error correction processing, etc. based on these signals are performed by the servo control unit 109 and the signal modulating/demodulating unit & ECC block 108.

Here, if recording signals demodulated by the signal modulating/demodulating unit & ECC block 108 are, e.g., recording signals for data storage of the computer, those recording signals are sent out to, e.g., external computer 130, etc. Thus, the external computer 130, etc. is caused to be of the configuration so as to have ability to receive, as reproduction signal, signals recorded on the optical disc 102.

Further, if recording signals demodulated by the signal modulating/demodulating unit & ECC block 108 are recording signal for audio•visual system, those recording signals are caused to undergo digital/analog conversion at the D/A concerting section of a D/A, A/D converter 112. Those recording signals are delivered to an audio•visual processing unit 113. Further, audio•video (visual) signal processing is performed at the audio•visual processing unit 113. The signal thus obtained is transmitted to external image pick-up•projection equipment through an audio•visual signal input/output unit 114.

The feed motor 105 is connected to the optical pick-up 104. The optical pick-up 104 is caused to undergo feed operation in the radial direction of the optical disc 102 by rotation of the feed motor 105, and is moved up to a predetermined recording track on the optical disc 102. The control of the spindle motor 103, the control of the feed motor 105, and the control of actuator for allowing the object lens of the optical pick-up 104 to undergo movement displacement in a focus direction of the optical axis direction thereof and in a tracking direction perpendicular to the optical axis direction are respectively performed by the servo control unit 109.

Namely, the servo control unit 109 performs control of the spindle motor 103 to perform control of the actuator on the basis of a focus error signal and a tracking error signal.

Moreover, the servo control unit 109 is caused to be of the configuration to respectively generate drive signals (drive currents) delivered to a pair of focus coils 20, 20 (see FIG. 2) and a pair of tracking coils 30, 30 (see FIG. 2) which will be described later on the basis of a focus error signal, a tracking error signal and a RF signal, etc. which are inputted from the processing unit 120.

Further, a laser control unit 121 serves to control laser light source in the optical pick-up 104.

Here, the focus direction F refers to the optical axis direction of object lens 7 (see FIG. 2) of the optical pick-up 104, the tangential direction Tz refers to a direction perpendicular to the focus direction F and a direction in parallel to the tangential direction of circumference of the optical disc 102, and tracking direction T refers to a direction perpendicular to the focus direction F and the tangential direction Tz. In addition, an angle of difference in which an angle that the optical axis of the object lens 7 and virtual line passing through the optical axis and extending in the radial direction of the optical disc 102 form deviate with respect to 90 degrees refers to tilt angle in the radial direction.

Then, the optical pick-up 104 will be explained in detail.

Figure 2:
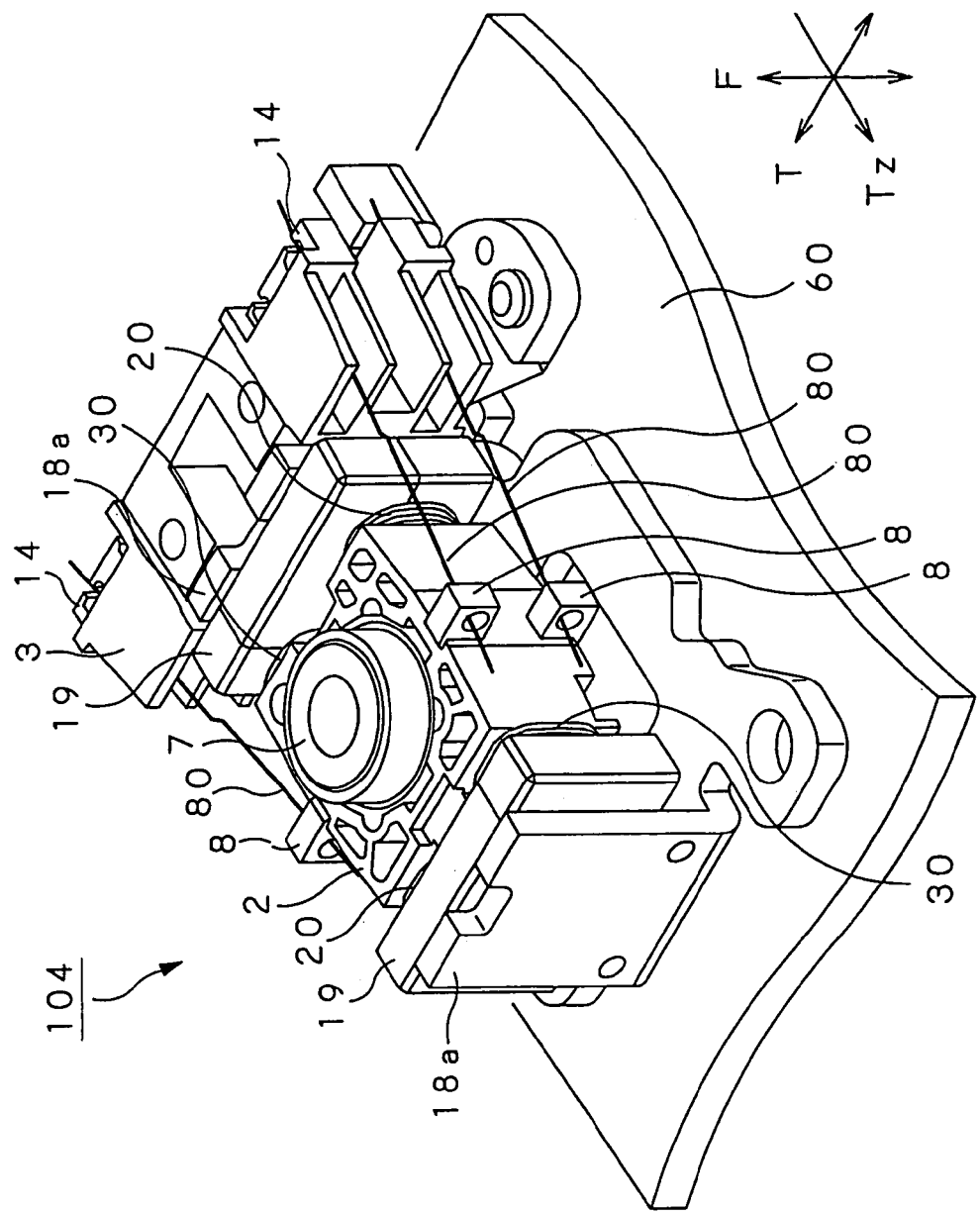
FIG. 2 is a perspective view showing a first embodiment of the optical pick-up according to the present invention.
Figure 3:
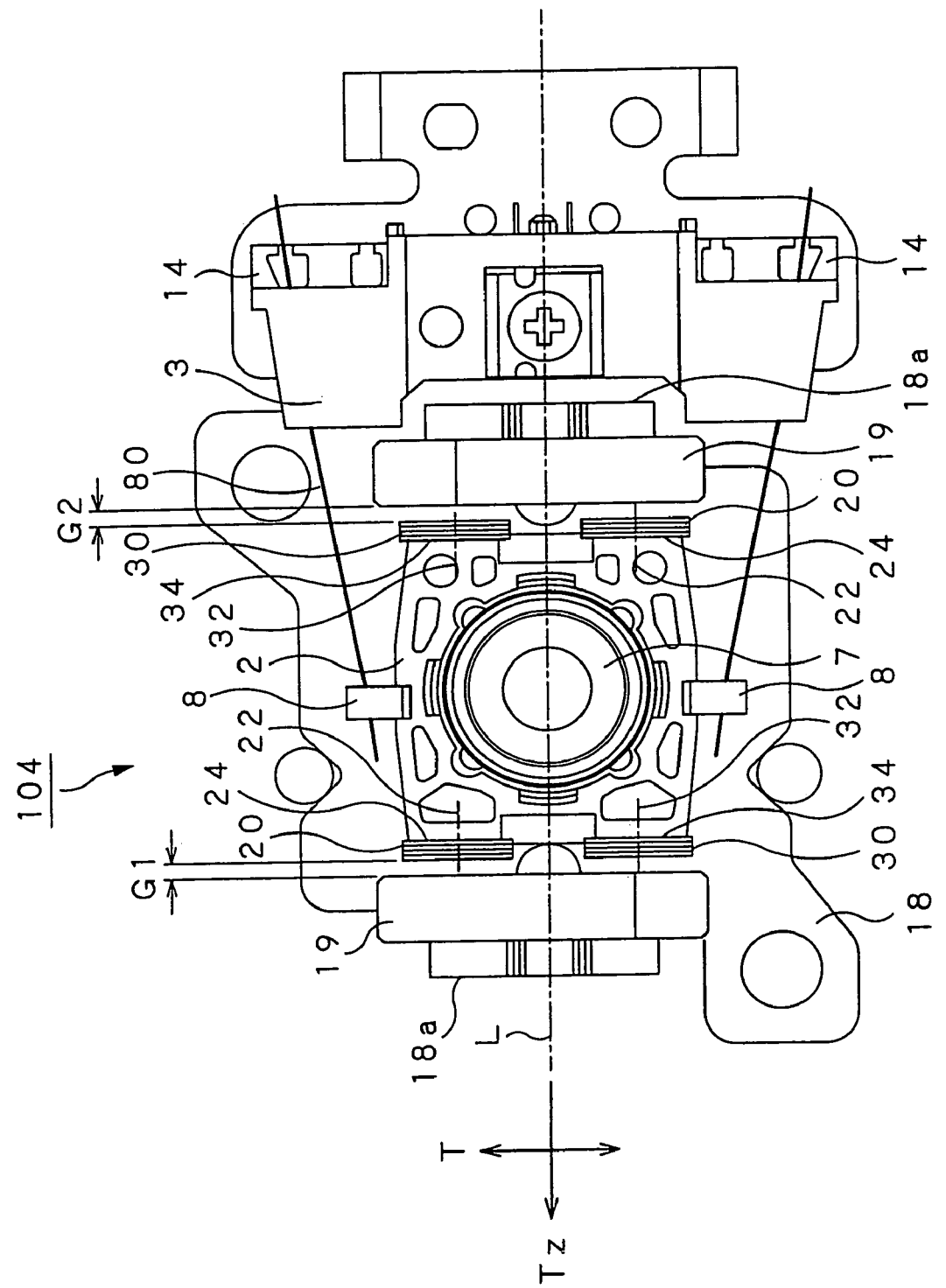
FIG. 3 is a plan view of the optical pick-up shown in FIG. 2.
Figure 4:
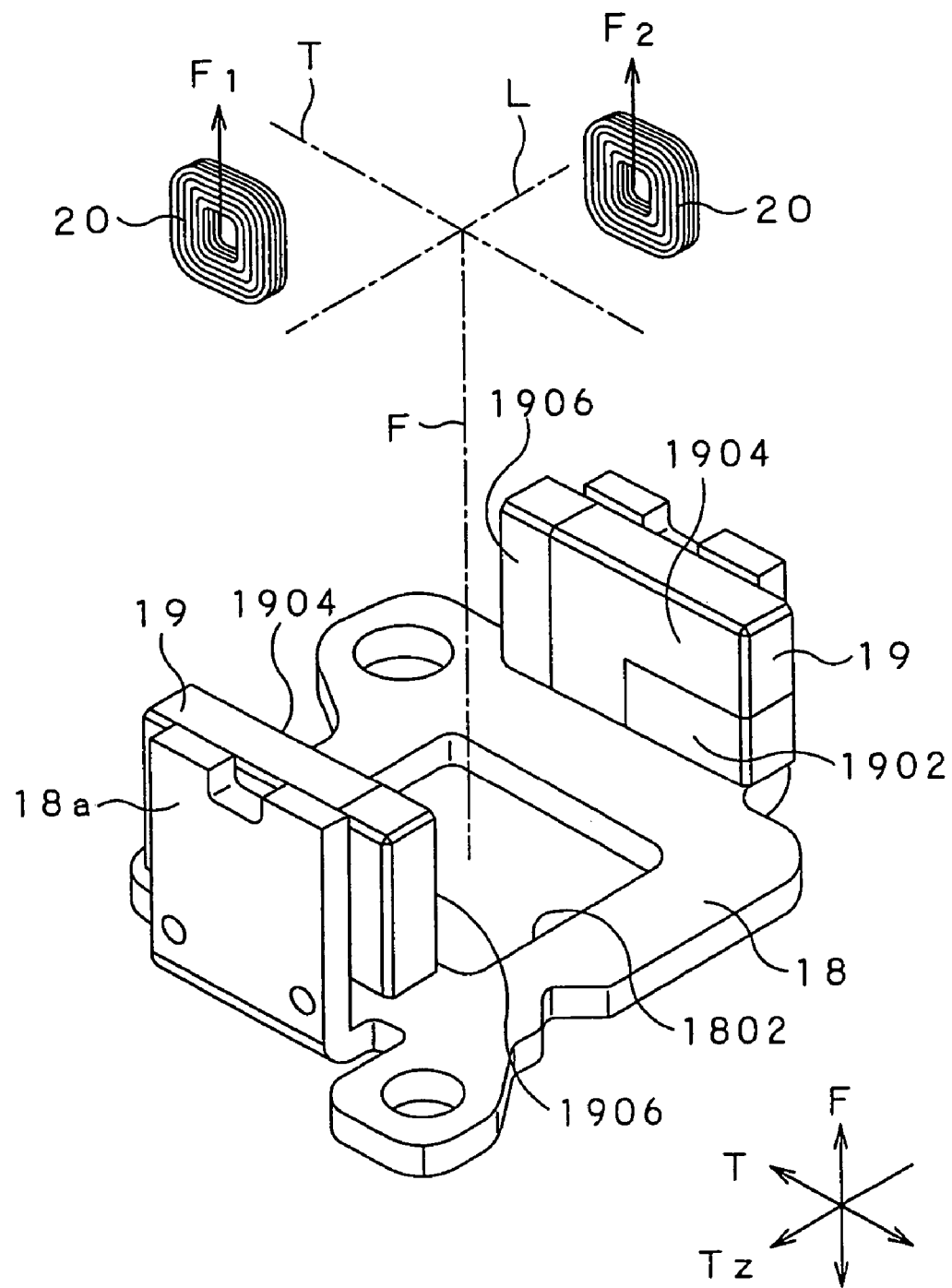
FIG. 4 is a perspective view showing the configuration of arrangement of focus coils provided at the optical pick-up according to the present invention.
Figure 5:
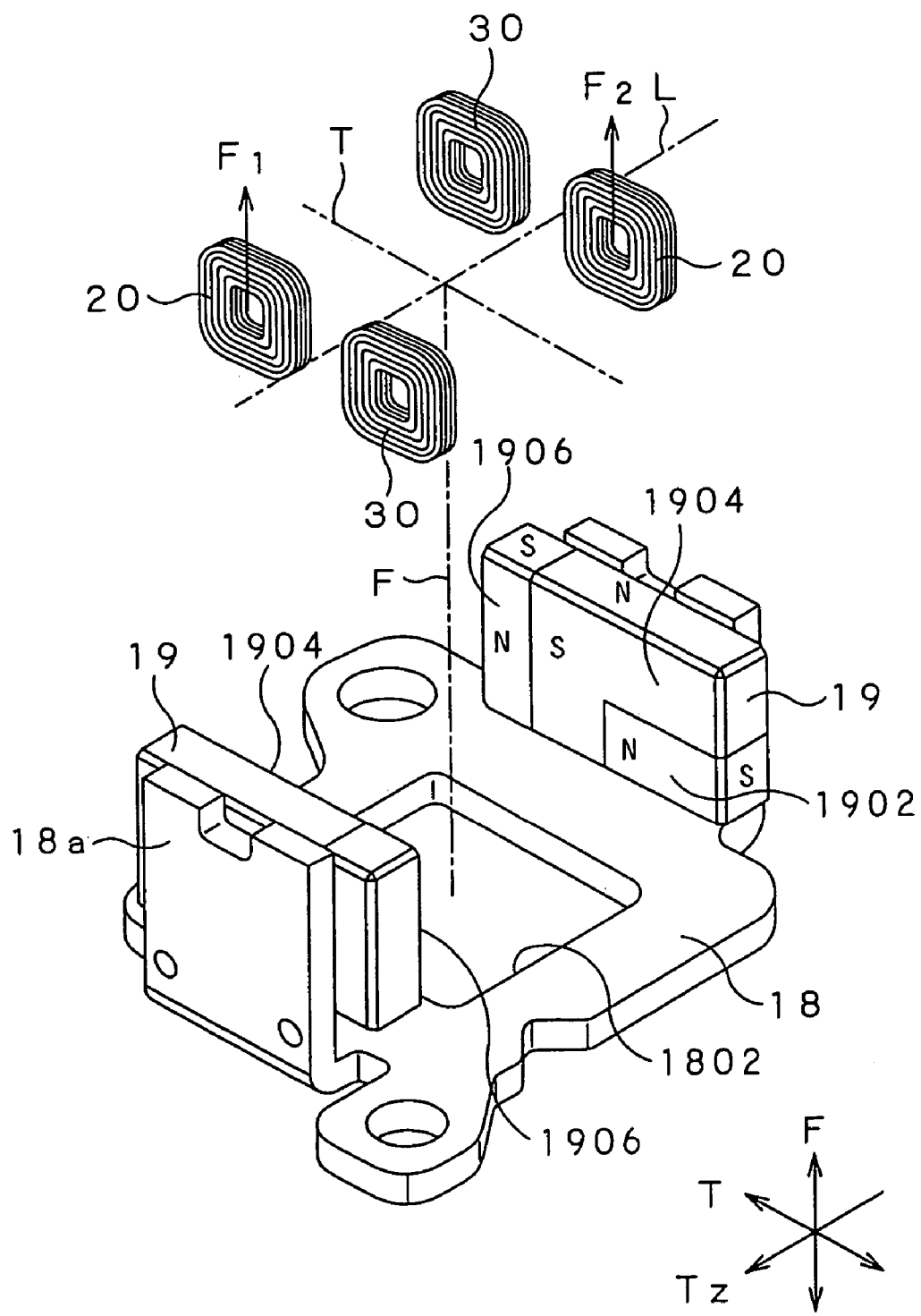
FIG. 5 is a perspective view showing the configuration of arrangement of focus coil and tracking coils provided at the optical pick-up according to the present invention.
Figure 6:
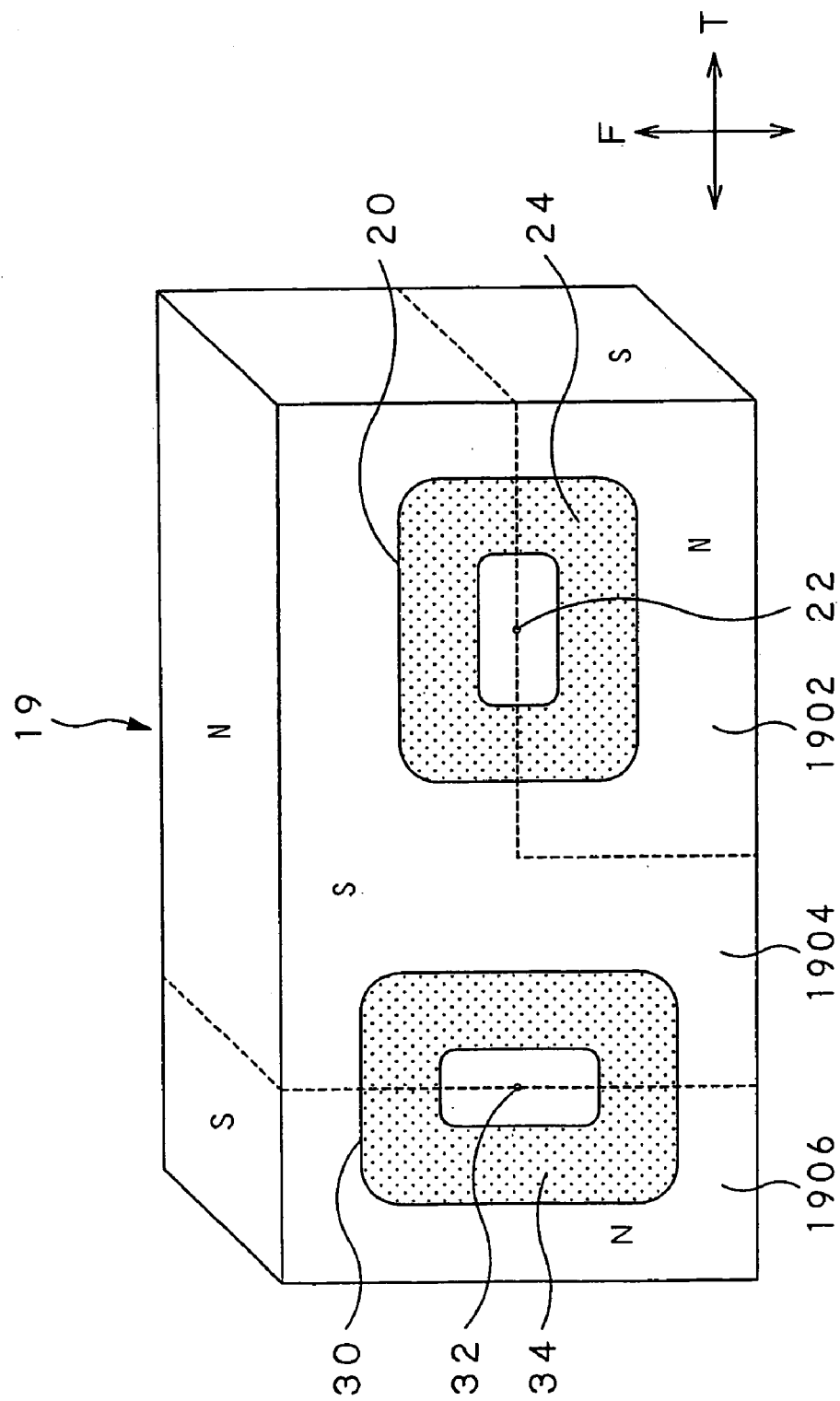
FIG. 6 is a perspective view showing the relationship of arrangement of focus coil, tracking coils and magnets which constitute the optical pick-up according to the present invention.

FIG. 2 is a perspective view showing the first embodiment of the optical pick-up to which the present invention is applied. FIG. 3 is a plan view thereof, and FIG. 4 is a perspective view showing the configuration of arrangement of focus coils provided at the optical pick-up shown in FIG. 2. FIG. 5 is a perspective view showing the configuration of arrangement of focus coils and tracking coils provided at the optical pick-up according to the present invention. FIG. 6 is a perspective view showing the relationship of arrangement of focus coil, tracking coil and magnets which constitute the optical pick-up according to the present invention.

The optical pick-up 104 to which the present invention is applied includes a semiconductor laser serving as a light source for emitting light beams, a photo-diode serving as a light detection element for detecting reflected light beams reflected from the signal recording surface of the optical disc 102, and an optical system for guiding light beams from the semiconductor laser to the optical disc 102, and for guiding reflected light beams to the light detection element.

As shown in FIG. 2, the optical pick-up 104 is provided on a base 60 provided so that it can be moved in the radial direction of the optical disc 102 within casing of the optical disc apparatus 100.

The optical pick-up 104 comprises a lens holder 2 for supporting an object lens 7 serving to converge light beams emitted from a light source to irradiate the light beams thus converged onto the optical disc 102, and a supporting block 3 disposed in a manner spaced from the lens holder 2 in the tangential direction and attached to the base 60, wherein the object lens 7 constitutes a portion of the optical system of the optical pick-up 104.

As shown in FIGS. 2 and 3, the lens holder 2 is provided in a manner to surround the outer circumferential surface side of the object lens 7, and holds the object lens 7 at the central portion thereof.

At both sides in the tracking direction of the lens holder 2, there are respectively provided arm supporting portions 8 by one piar at an interval in the focus direction.

As shown in FIGS. 2 and 3, the supporting block 3 has length along the tracking direction, and height along the focus direction.

At both sides of the supporting block 3 along the tracking direction, there are respectively provided a pair of supporting portions 14 at an interval in the focus direction.

The respective pairs of arm supporting portions 8 of the both sides in the tracking direction of the lens holder 2 and the respective pairs of arm supporting portions 14 of the both sides in the tracking direction of the supporting block 3 are respectively connected by one and the other pairs of supporting arms 80.

As shown in FIG. 2, the respective one and the other supporting arms 80 are provided in parallel to each other at interval in the focus direction, and movably support the lens holder 2 with respect to the supporting block 3 in the focus direction F and in the tracking direction T.

These respective supporting arms 80 are constituted by linear member having conductivity and having elasticity. The end portions of the supporting block 3 side among the respective supporting arms 80 are connected to servo control unit 109 through wiring member although not shown. A drive currents for focus corresponding to the focus error signal is delivered from the servo control unit 109 to the respective focus coils 20, 20 through these supporting arms 80. A drive current corresponding to tracking signal is delivered to the respective tracking coils 30, 30.

Further, at the lens holder 2, there are provided a pair of focus coils 20, 20 supplied with a drive current to thereby move the lens holder 2 in the focus direction, and a pair of tracking coils 30, 30 supplied with a drive current to thereby move the lens holder 2 in the tracking direction.

In this embodiment, the focus coils 20, 20 and the tracking coils 30, 30 are constituted by flat rectangular coils each comprised of printed coil, etc. Moreover, the respective focus coils 20, 20 are formed so that the number of windings and the external dimensions are equal to each other, and the respective tracking coils 30, 30 are formed so that the number of windings and external dimensions are equal to each other.

As shown in FIG. 3, the pair of focus coils 20, 20 respectively comprise coil surfaces 24 perpendicular to the winding axes 22. These pair of focus coils 20, 20 are attached to the peripheral surface of the lens holder 2 so as to take bilateral symmetry with virtual axis L passing through the optical axis center of the object lens 7 being as center.

In this embodiment, the respective focus coils 20, 20 are disposed in the state where the winding axes 22 are extended in parallel to the tangential direction Tz and the coil surfaces 24 are positioned on the plane surface perpendicular to the tangential direction.

Moreover, as shown in FIG. 3, the pair of tracking coils 30 respectively have coil surfaces 34 perpendicular to the winding axes 32 of the coil portions thereof. Further, as shown in FIGS. 3 and 5, the pair of tracking coils 30, 30 are so attached to the peripheral surface of the lens holder 2 as to face the tangential direction with the object lens 7 put therebetween, the pair of tracking coils being shifted in left and right directions respectively away from the virtual axis L which is perpendicular to the tracking direction T and passes along the optical axis center of the object lens 7, the coil surfaces being directed toward the tangential direction.

In this embodiment, the respective tracking coils 30, 30 are arranged in the state where the winding axes 32 are extended in parallel to the tangential direction Tz, and the coil surfaces 34 are positioned on the plane surface perpendicular to the tangential direction.

As stated above, in this embodiment, the focus coils 20 and the tracking coils 30 are arranged by respective one pairs in a manner in parallel to one surface side and the other surface side which constitute the peripheral surfaces of the lens holder 2 opposite to each other in the tangential direction Tz with the object lens 7 being put therebetween. The focus coils 20 and the tacking coils 30 which are respectively attached at one surface and the other surface of the lens holder 2 are arranged in parallel at a predetermined interval in the tracking direction T.

The pair of focus coils 20 disposed with the object lens 7 being put therebetween and the pair of tracking coils 30 similarly disposed with the object lens 7 being put therebetween are electrically connected to end portions of the lens holder 2 side of four supporting arms 80. There is employed a configuration such that the pair of focus coils 20 are respectively independently supplied with two drive currents for focus through the supporting arms 80, and the pair of tracking coils 30 are commonly supplied with one drive current for tracking through the supporting arms 80.

Further, between the lens holder 2 and the base 60, as shown in FIG. 2, there is disposed a yoke 18 at an interval in the focus direction F. As shown in FIG. 2, the yoke 18 is attached on the base 60. Substantially at the central portion of the yoke 18, as shown in FIG. 4, there is provided an opening portion 1802 for allowing light beams incident on the object lens 7 to be transmitted therethrough.

At both sides in the tangential direction Tz of the yoke 18, as shown in FIGS. 2 and 3, there are formed, in a rising manner, a pair of yoke pieces 18a, 18a in the state opposite to each other with the object lens 7 being put therebetween.

At plane surfaces opposite to each other of the respective yoke pieces 18a, 18a, there are attached magnets 19, 19.

In addition, as shown in FIG. 6, the respective magnets 19 are formed so as to take rectangular shape, and are attached to the respective yoke pieces 18a, 18a in such a manner that the long side is caused to be in parallel to the tracking direction T and the short side is caused to be in parallel to the focus direction F.

The respective magnets 19, 19 used here are formed as integrated magnets having plural different magnetized regions. Magnetization is implemented to the respective magnets 19, 19 so that the surface sides facing to the lens holder 2 have magnetized region as shown in FIG. 6 when they are attached to the respective yoke pieces 18a, 18a.

Here, the respective magnets 19, 19 are magnetized so that the region opposite to the coil surface 24 of the focus coil 20 is polarized in the focus direction F. Namely, the respective magnets 19, 19 are magnetized so that portions opposite to respective sides in parallel to the tracking direction T of the focus coil 20 formed so as to have rectangular shape are caused to be magnetized regions different from each other. Here, at the respective magnets 19, 19, there are provided a first magnetized porion 1902 magnetized so that the region faced to side positioned at the lower side in FIG. 6 of the focus coil 20 has N-pole, and a second magnetized portion 1904 magnetized so that the portion faced to the side positioned at the upper side in FIG. 6 of the focus coil 20 has S-pole.

Further, the respective magnets 19, 19 are magnetized so that the region opposite to the coil surface 34 of the tracking coil 30 is polarized in the tracking direction T. Namely, the respective magnets 19, 19 are magnetized so that portions faced to respective sides in parallel to the focus direction F of the tracking coil 30 formed so as to take rectangular shape are caused to be magnetized regions different from each other. Here, at the respective magnets 19, 19, there is provided a third magnetized portions 1906 magnetized so that the region opposite to the side positioned at the left side in FIG. 6 of the tracking coil 30 has N-pole. In this case, the portion opposite to the side positioned at the right side in FIG. 6 of the tracking coil 30 is magnetized so that it has S-pole. A portion of the second magnetized portion 1904 which allows the S-pole to be opposed to the focus coil 20 is faced to the region magnetized so as to have S-pole. Accordingly, at the second magnetized portion 1904, magnetization is implemented in L-form so that the region opposite to the side positioned at the right side in FIG. 6 of the tracking coil 30 from the side positioned at the right side in FIG. 6 of the tracking coil 30 has S-pole.

Moreover, in this embodiment, as shown in FIG. 3, there is employed a configuration such that spacings G1 between magnetic pole surfaces of the two magnets 19 and coil surfaces 24 of the two focus coils 20 are equal to each other. There is employed a configuration such that spacings G2 between magnetic pole surfaces of the two magnets 19 and coil surfaces 34 of the two tracking coils 30 are equal to each other.

Then, the operation of the above-described optical pickup 104 will be explained.

Initially, explanation will be given in connection with the case where the lens holder 2 is moved in the focus direction and in the tracking direction.

When two drive currents for focus which have been set so that current values are the same are respectively delivered from the servo control unit 109 to the pair of focus coils 20, 20, a force in the focus direction produced by magnetic interaction between magnetic filed produced at the pair of focus coils 20, 20 and magnetic filed of the first and second magnetized portions 1902 and 1904 of the respective magnets 19 is exerted on the holder 2 against a restoring force which serves to restore (return) the lens holder 2 toward the neutral position in the focus direction by the supporting arms 80 so that the lens holder 2 is moved in the focus direction.

At this time, since current values of two drive currents for focus respectively delivered to the pair of focus coils 20, 20 are the same, there is not produced, as shown in FIGS. 4 and 5, difference between two forces $F_1$, $F_2$ in the focus direction respectively exerted on the pair of focus coils 20, 20, i.e., two forces $F_1$, $F_2$ exerted on two portions of the lens holder 2 in which the respective focus coils 20, 20 are provided. Accordingly, the lens holder 2 dose not undergo a force in a direction rotating with virtual axis L passing along the optical axis of the object lens 7 and extending in the tangential direction being as center As a result, the tilt angle is not changed.

Moreover, when drive currents for tracking common in the current value are delivered to the pair of tracking coils from the servo control unit 109 to the pair of tracking coils 30, 30, a force in the tracking direction is exerted on the lens holder 2 by magnetic interaction between magnetic filed produced at the tracking coil 30 and magnetic filed of the second and third magnetized portions 1904 and 1906 of the respective magnets 19 against a restoring force for restoring (returning) the lens holder 2 toward the neutral position in the tracking direction by the supporting arms 80 so that the lens holder 2 is moved in the tracking direction.

It is to be noted that, in the state where no drive current for focus is delivered to the focus coils 20, 20, the lens holder 2 is held by the supporting arm 80 at the neutral position in the focus direction. Moreover, in the state where no drive current for tracking is delivered to the tracking coil 30, the lens holder 2 is held by the supporting arms 80 at the neutral position in the tracking direction.

Then, explanation will be given in connection with the case where the lens holder 2 is moved in a direction where the tilt angle is changed.

When two drive currents for focus having current values different from each other are delivered from the servo control unit 109 to the pair of focus coils 20, 20, a force in the focus direction produced by magnetic interaction between magnetic field produced at the pair of focus coils 20 and magnetic field of the first and second magnetized portions 1902 and 1904 of the respective magnets 19 is exerted on the lens holder 2 against a restoring (return) force for restoring (returning) the lens holder 2 toward the neutral position in the focus direction by the supporting arm 30 so that the lens holder 2 is moved in the focus direction.

At this time, since drive currents for focus respectively delivered to the respective focus coils 20, 20 have current values different from each other, there is produced, as shown in FIGS. 4 and 5, a difference between two forces $F_1$, $F_2$ in the focus direction respectively exerted on the respective focus coils 20, i.e., two forces $F_1$, $F_2$ exerted on two portions of the lens holder 2 in which the respective focus coils 20, 20 are provided. As a result, the lens holder 2 undergoes a force in a direction rotating with the virtual axis L being as center so that tilt angle is changed. The change quantity of the tilt angle is determined by difference between two forces $F_1$, $F_2$ in the focus direction respectively exerted on the pair of focus coils 20, 20, in other words, difference between current values of drive current for focus respectively delivered to the pair of focus coils 20, 20.

A drive current for focus delivered from the servo control unit 109 to the respective focus coils 20, 20 is controlled so that it takes a value such that value obtained as the result of the fact that, e.g., the servo control unit 109 monitors jitter value of RF signal inputted from the signal processing unit 120 so that the jitter value thus obtained is reduced.

In the optical pick-up 104 of this embodiment, since respective focus coils 20, 20 are so attached to the peripheral surface of the lens holder 2 as to face the tangential direction with the object lens 7 put therebetween, the focus coils 20, 20 being shifted in the tracking direction T respectively away from each other, magnitudes of drive currents delivered to the respective focus coils 20, 20 are adjusted to produce difference in a force in the focus direction exerted on the respective focus coils 20, 20. Thus, it is possible to move the lens holder 2 in a direction where the tilt angle is changed.

Accordingly, the actuator dedicated for tilt angle control which serves to move the lens holder 2 in a direction where the tilt angle is changed becomes unnecessary. As a result, the actuator for tilt angle control and parts relating to the actuator can be reduced so that miniaturization can be realized. Further, since drive current delivered to the dedicated actuator becomes unnecessary, reduction of power consumption can be realized.

Moreover, as the result of the fact that the strength and/or the mechanical characteristic of the supporting mechanism for holding the lens holder 2 are caused to be unbalanced, in the configuration adapted to incline or tilt the lens holder in accordance with position (movement quantity) in the focus direction of the lens holder 2 to change the tilt angle, unnecessary inclination (skew) is apt to take pace in the lens holder 2, when the lens holder 2 is moved in the focus direction and in the tracking direction, resulting from the strength and/or the mechanical characteristic of the supporting mechanism. As a result, high accuracy is required for structural or mechanical parts which support the lens holder 2 and assembling of these structural or mechanical parts in order to suppress such inclination. However, in the present invention, there does not exist such a request. Thus, parts cost and assembling cost can be reduced.

Further, in this embodiment, since the focus coils 20, 20 are constituted by flat coils in which the coil surfaces 24 thereof are in contact with the magnetic pole surfaces of the magnets 19, substantially the entire area of the focus coil 20 crosses with magnetic field from the first and second magnetized portions 1902 and 1904 of the magnet 19. Thus, a force in the focus direction can be efficiently produced by less drive current while realizing miniaturization of the focus coils 20, 20.

It is to be noted that, in the optical pick-up 104 according to the present invention, there may be employed a configuration adapted to incline or tilt the lens holder 2 in accordance with position (movement quantity) in the focus direction of the lens holder 2 to change tilt angle.

For example, as shown in FIG. 3, spacing G1 between the magnetic pole surface of one magnet 19 among two magnets 19, 19 and coil surface 24 of one focus coil 20 faced to the magnetic pole surface of one magnet 19, and spacing G2 between the magnetic pole surface of the other magnet 19 and the coil surface 24 of the other focus coil 20 faced to the magnetic pole surface of the other magnet 19 are caused to be different from each other.

Setting of the spacings G1, G2 can be easily realized by providing an adjustment mechanism for slidably supporting, along the tangential direction, at least one of the yoke 18 and the supporting block 3 which are assembled with respect to the base 60. As such an adjustment mechanism, there can be applied conventionally well known various mechanisms.

When setting is made in this way such that spacings G1, G2 between respective focus coils 20, 20 and magnets 19, 19 are different from each other, there is produced a difference between density of magnetic field produced between one focus coil 20 and one magnet 19 and density of magnetic field produced between the other focus coil 20 and the other magnet 19. As a result, forces $F_1$, $F_2$ in the pair of focus directions exerted on respective plane surfaces opposite to each other of the lens holder 2 become unbalanced.

In such configuration, when a drive current corresponding to a focus error signal is delivered to the pair of focus coils 20, 20, the lens holder 2 is inclined or tilted in accordance with position (movement quantity) in the focus direction of the lens holder 2 thus to have ability to change tilt angle.

In this case, if magnitudes of drive currents respectively delivered to the pair of focus coils 20, 20 are caused to be the same, it is possible to change tilt angle in accordance with position (movement quantity) in the focus direction of the lens holder 2. However, if drive currents having magnitudes different from each other are delivered to the respective focus coils 20, 20 on the basis of measurement result of jitter value of RF signal as previously described, there is employed an approach to control the magnitudes of drive currents delivered to the respective focus coils 20 simultaneously with changing the tilt angle in accordance with position (movement quantity) in the focus direction of the lens holder 2, thereby making it possible to more precisely adjust the tilt angle. This is further advantageous to improvement in the quantity of RF signal.

Moreover, while explanation has been given in connection with the case where spacings G1, G2 between respective focus lenses 20, 20 and respective magnets 19, 19 are caused to be different from each other so that two forces in the focus directions exerted on respective plane surfaces opposite to each other of the lens holder 2 are caused to be unbalanced, the configuration adapted for allowing two forces $F_1$, $F_2$ in the focus direction exerted on respective plane surfaces opposite to each other of the lens holder 2 to be unbalanced is not limited to the above-mentioned configuration, but, e.g., the number of windings of the pair of focus coils 20 are caused to be different from each other to thereby allow magnetic flux densities produced at the respective focus coils 20 to be different from each other, or to thereby allow magnetic forces of magnets 19, 19 respectively opposite to the respective focus coils 20, 20 to be different from each other.

Then, the second embodiment of the optical pick-up of the present invention will be explained.

The second embodiment different from the previously described first embodiment in the arrangement of the focus coil and the tracking coil.

Figure 7:
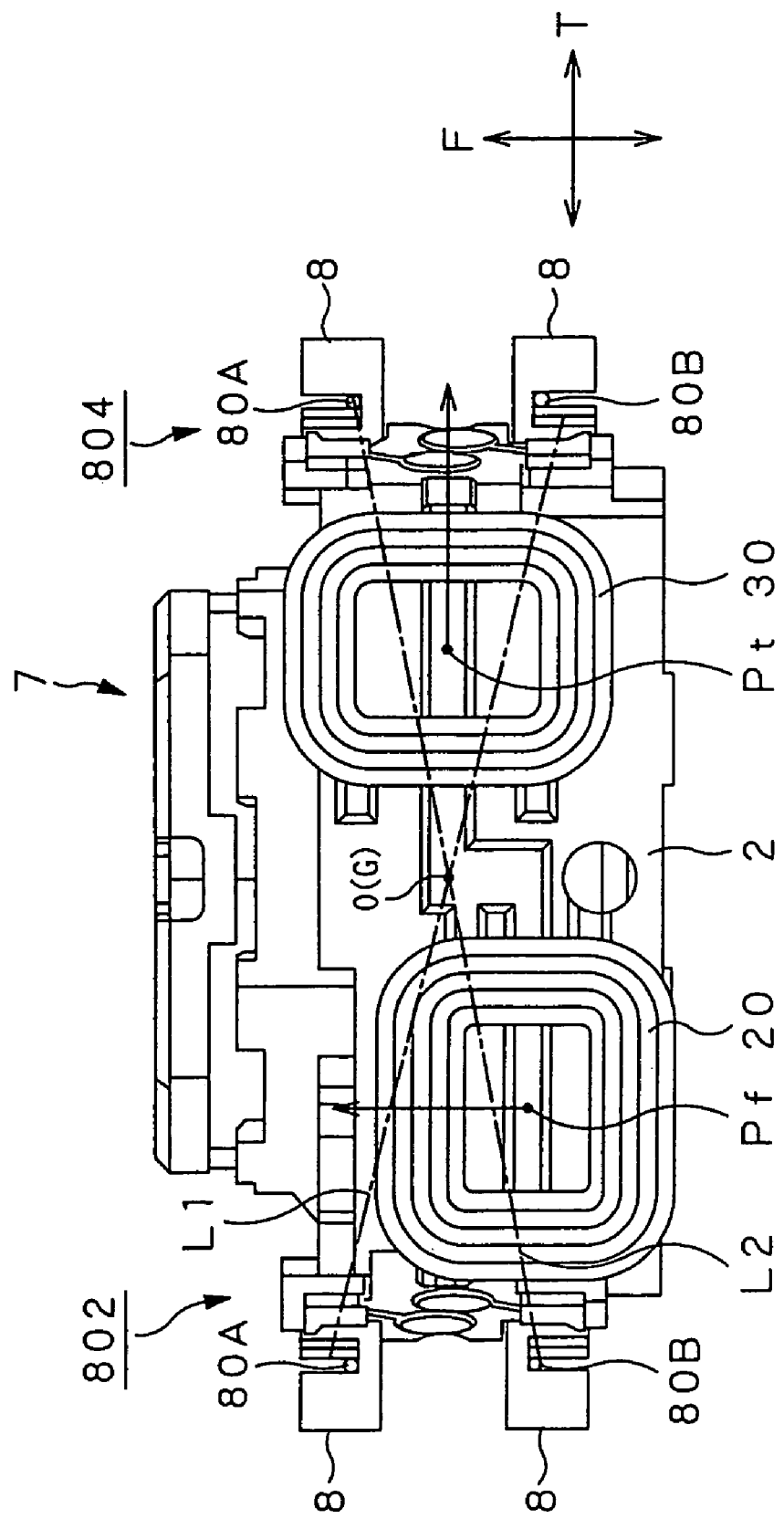
FIG. 7 is a front view showing the configuration of arrangement of focus coil and tracking coil in a second embodiment of the optical pick-up according to the present invention.

FIG. 7 is a front view showing the configuration of arrangement of the focus coil and the tracking coil of the optical pick-up according to the second embodiment.

In the following explanation, common reference numerals are respectively attached to portions common to the previously described first embodiment, and the detailed explanation will be omitted.

In the optical pick-up according to this embodiment, as shown in FIG. 7, the supporting arms 80 are formed from a pair of left supporting arms 802 and a pair of right supporting arms 804 which are extended in the tangential direction in the state positioned at both sides of the object lens 7. The pair of left supporting arms 802 and the pair of right supporting arms 804 are respectively disposed in the state where their heights are different from each other in the optical axis direction of the object lens 7.

Further, the first virtual axis connecting arm supporting portion 8 serving as a connecting portion of upper supporting arm 80A and positioned at the upper side in the optical axis direction of the object lens among the pair of left supporting arms 802 and the lens holder 2, and the arm supporting portion 8 serving as a connecting portion of lower supporting arm 80B positioned at the lower side in the optical axis direction of the object lens 5 among the pair of right supporting arm 804 and the lens holder 2 is assumed to be L1.

In addition, the second virtual axis connecting arm supporting portion 8 serving as a connecting portion between lower supporting arm 80B and positioned at the lower side in the optical axis direction of the object lens 5 among the pair of left supporting arms 802 and the lens holder 2, and arm supporting portion 8 serving as a connecting portion between supporting arm 80A and lens holder 2 positioned at the upper side in the optical axis direction of the object lens 5 among the pair of right supporting arm 804 and the lens holder 2 is assumed to be L2.

In the case where crossing point connecting these first and second virtual axes L1 and L2 is assumed as O, the crossing point O is constituted at the same height (position in the focus direction) as the drive center Pt on which a drive force produced by respective tracking coils 30, 30 as the result of the fact that a drive current is delivered to respective tracking coils 30, 30 is exerted, and the crossing point O is constituted at the same height (position in the focus direction) as the center of gravity G of the lens holder 2 including object lens 7, focus coils 20, 20 and tracking coils 30, 30.

In this embodiment, the drive center Pf on which drive forces $F_1$, $F_2$ produced by respective focus coils 20, 20 as the result of the fact that a drive current is delivered to respective focus coils 20, 20 are exerted deviates in the optical axis direction of the object lens 7 with respect to the position of center of gravity G of the lens holder 2 which includes the object lens 7, but does not include focus coils 20, 20 and tracking coils 30, 30. Namely, as shown in FIG. 7, the drive center Pf on which drive forces $F_1$, $F_2$ produced by respective focus coils 20, 20 are exerted deviates toward lower direction with respect to the optical axis direction of the object lens 7.

When height of the crossing point O is not in correspondence with height of drive center Pt of the respective tracking coils 30, 30, the lens holder 2 fluctuates around the axis passing through the crossing point O and extending in the tangential direction when drive force by the tracking coils 30, 30 is produced so that skew in the radial direction is apt to take place. However, in the second embodiment, since height in the optical axis direction of the object lens 7 of the crossing point O is in correspondence with height of drive center Pt of respective tracking coils 30, 30, skew in the radial direction can be suppressed.

Further, when height of crossing point O is not in correspondence with height of center of gravity G of the lens holder 2 including object lens 7, focus coils 20, 20 and tracking coils 30, 30, the lens holder 2 resonates around the axis passing through the crossing point O and extending in the tangential direction when drive force by tracking coils 30, 30 is produced so that it is apt to vibrate. However, in the second embodiment, since height of the crossing point O is in correspondence with height of center of gravity G of the lens holder 2 including object lens 7, focus coils 20, 20 and tracking coils 30, 30, it is possible to suppress resonance. Thus, the frequency characteristic of the optical pick-up 104 can be improved.

It is to be noted that while since the object lens 7 is held at the position close to the optical disc of the lens holder 2, center of gravity G of the lens holder 2 which includes the object lens 7 and does not include focus coil 20 and tracking coil 30 is positioned in the state where it is caused to undergo displacement toward the upper side positioned at the optical disc side in the optical axis direction of the object lens 7, drive center Pf of respective focus coils 20, 20 is caused to undergo displacement toward the lower side spaced from the optical disc in the optical axis direction of the object lens 7 by the position of center of gravity of the lens holder 2 which includes the object lens 7 and does not include focus coils 20, 20 and tracking coils 30, 30 in the second embodiment to thereby allow the crossing point O to be in correspondence with center of gravity G of the lens holder 2 including the object lens 7, the focus coils 20, 20 and the tracking coils 30, 30.

In concrete terms, as shown in FIG. 7, focus coils 20 and tracking coils 30 which are attached in parallel on one surface of the lens holder 2 are attached in the state where the winding axial line is shifted toward the focus direction which is the optical axis direction of the object lens 7.

As stated above, in the optical pick-up of this embodiment, since the focus coils 20, 20 are used as weight for adjusting the position of center of gravity G, height of the crossing point O and height of center of gravity G can be in correspondence with each other without increasing the number of parts. Thus, cost can be reduced and miniaturization can be realized.

Then, the third embodiment according to the present invention will be explained. In the following explanation, common reference numerals are respectively attached to portions common to the previously described first embodiment, and the detailed explanation will be omitted.

The optical pick-up 304 according to the third embodiment is used for an optical disc apparatus in which plural kinds of optical discs where plural kinds of light beams having wavelengths different from each other are selectively used so that recording or reproduction of information signals is performed are selectively used as recording media. As an optical disc apparatus of this kind, there is an optical disc apparatus in which there are used, as recording media, e.g., a first optical disc where light beams having wavelength of 400 to 410 mm are used so that recording or reproduction of information signals is performed, a second optical disc where light beams having wavelength of 650 to 660 nm are used so that recording or reproduction of information signals is performed, and a third optical disc where light beams having wavelength of 760 to 800 nm are used so that recording or reproduction of information signals is performed.

Figure 8:
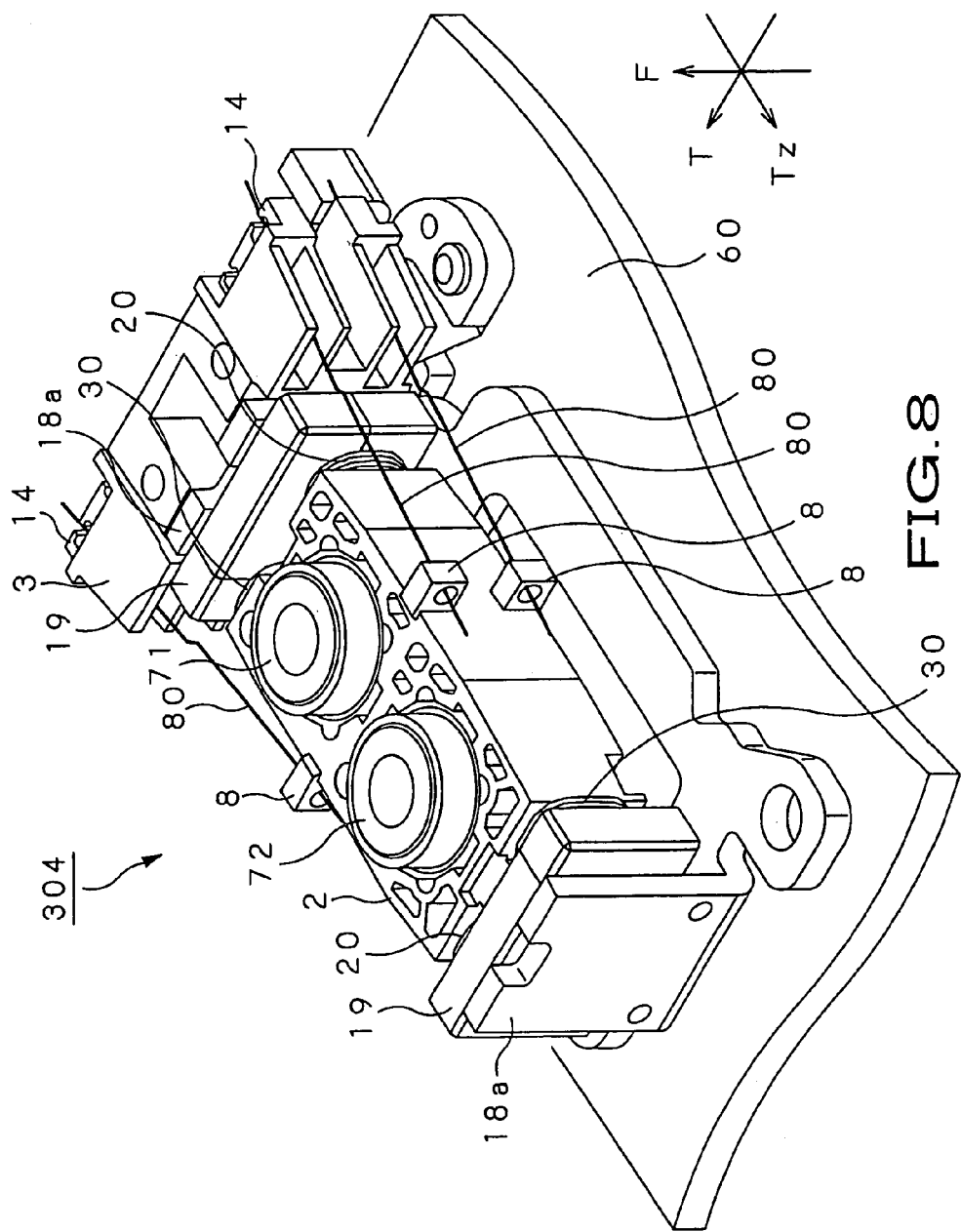
FIG. 8 is a perspective view showing a third embodiment of the optical pick-up according to the present invention.
Figure 9:
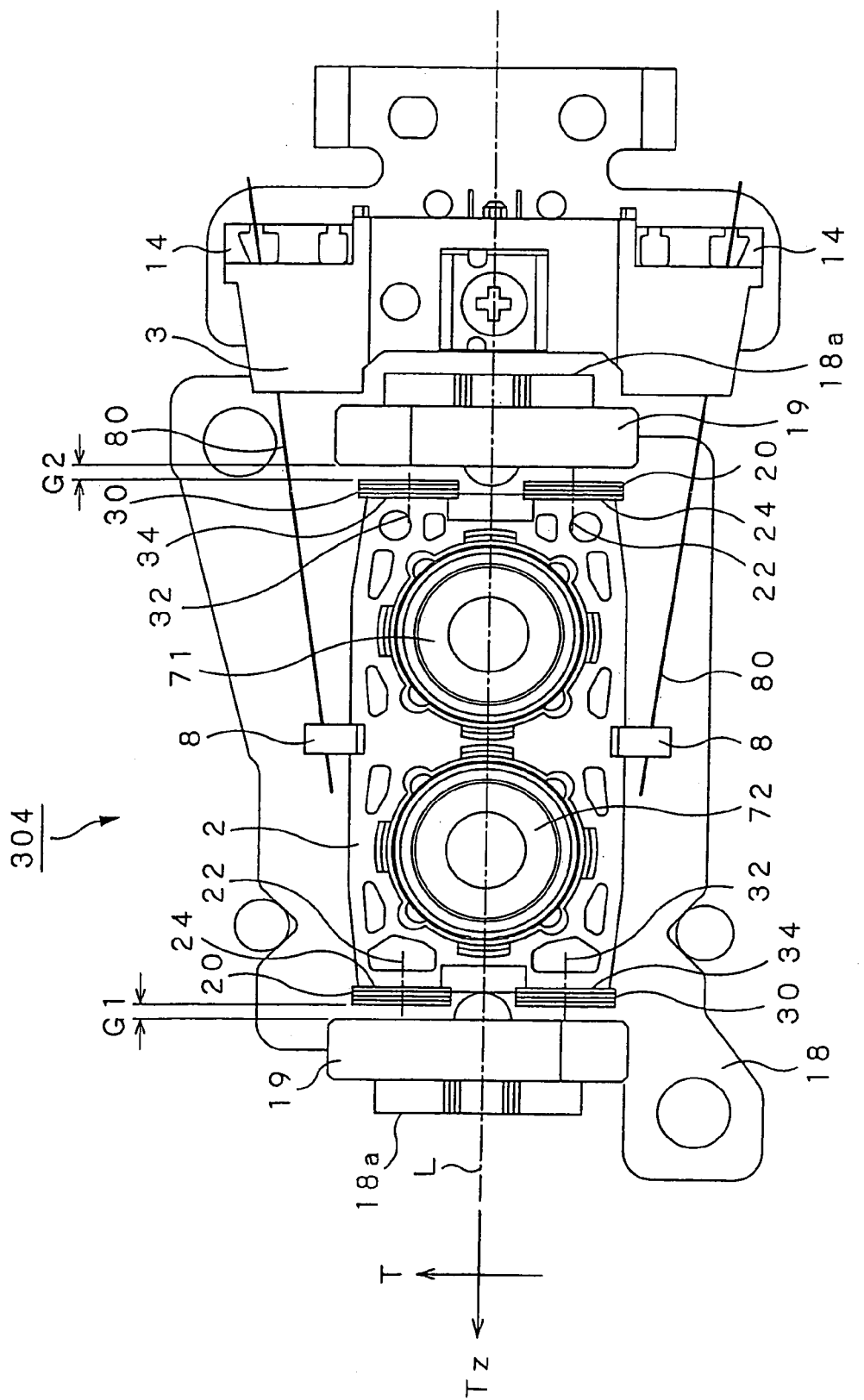
FIG. 9 is a plan view of the optical pick-up shown in FIG. 8.

At the optical pick-up 304 used for the optical disc apparatus in which plural optical discs respectively using light beams having wavelength different from each other are selectively used, there is proposed, as shown in FIGS. 8 and 9, an optical disc apparatus using plural object lenses in correspondence with light beams having wavelengths different from each other. For example, there is an optical disc apparatus comprising a first object lens 71 for converging light beams having wavelength of 400 to 410 nm onto the first optical disc, and a second object lens 72 for converging light beams having wavelength of 650 to 660 nm onto the second or third optical disc.

As shown in FIGS. 8 and 9, similarly to the previously described optical pick-up 104, the optical pick-up 304 of the third embodiment comprises single lens holder 2. The first and second object lenses 71, 72 are attached to the lens holder 2. Here, the first and second object lenses 71, 72 are arranged in the tangential direction Tz which is extending direction of the supporting arm 80. Here, the first object lens 71 is disposed in the state positioned at the arm supporting portion 3 side which is the fixed portion side of the supporting arm 80, and the second object lens 72 is disposed in the state positioned at the front end side of the lens holder 2.

The lens holder 2 to which the first and second object lenses 71, 72 are attached is supported by the supporting arms 80 at both sides of the intermediate portion between optical axes of the first and second object lens 71, 72 in the extending direction of the supporting arm 80. Namely, the front end portion of the supporting arm 80 is fixed to the arm supporting portions 8 provided at both sides of the intermediate portion between optical axes of the first and second object lenses 71, 72 so that the lens holder 2 is supported so that it can be caused to undergo displacement in biaxial directions perpendicular to each other of at least the focus direction F and the tracking direction T.

It is to be noted that it is desirable that both sides of the center of gravity of the lens holder 2 to which focus coils 20, 20 and tracking coils 30, 30 are attached are located at the position supported by the front end portion of the supporting arms 80 of the lens holder 2. As the result of the fact that such position is supported, the first and second object lenses 71, 72 can be caused to stably undergo displacement in the focus direction F and in the tracking direction T without producing torsion, etc.

Meanwhile, in the optical pick-up 304 of this embodiment, as shown in FIG. 9, spacing G1 between the magnetic pole surface of one magnet 19 among two magnets 19, 19 and coil surface 24 of one focus coil 20 faced to the magnetic pole surface of one magnet 19 and spacing G2 between the magnetic pole surface of the other magnet 19 and coil surface 24 of the other focus coil 20 faced to the magnetic pole surface of the other magnet 19 are caused to be different from each other.

Setting of the spacings G1, G2 can be easily realized by providing adjustment mechanism for slidably supporting, along the tangential direction, at least one of the yoke 18 and the supporting block 3 which are assembled on the base 60. As such an adjustment mechanism, conventionally well known various mechanisms can be applied.

When setting is made such that spacings G1, G2 between respective focus coils 20 and magnets 19 are caused to be different from each other as stated above, there is produced a difference between density of magnetic field produced between one focus coil 20 and one magnet 19 and density of magnetic field produced between the other focus coil 20 and the other magnet 19. Thus, a pair of forces $F_1$, $F_2$ in the focus direction exerted on respective plane surfaces opposite to each other of the lens holder 2 become unbalanced.

In such a configuration, when a drive current corresponding to a focus error signal is delivered to the pair of focus coils 20, 20, the holder 2 is inclined or tilted in accordance with position (movement quantity) in the focus direction of the lens holder 2, thus making it possible to change tilt angle.

In this case, if magnitudes of drive currents respectively delivered to the pair of focus coils 20, 20 are caused to be the same, it is possible to change tilt angle in accordance with position (movement quantity) in the focus direction of the lens holder 2. On the other hand, if drive currents of which magnitudes are different from each other are delivered to respective focus coils 20, 20 on the basis of measurement result of jitter value of RF signal as previously described, the magnitude of drive current delivered to respective focus coils 20 is controlled simultaneously with changing tilt angle in accordance with position (movement quantity) in the focus direction of the lens holder 2, thereby making it possible to more precisely adjust tilt angle. This is further advantageous to improvement in quality of RF signal.

Moreover, while explanation has been given in connection with the case where spacings G1, G2 between respective focus coils 20, 20 and respective magnets 19, 19 are caused to be different from each other so that two forces $F_1$, $F_2$ in the focus direction exerted on respective plane surfaces opposite to each other of the lens holder 2 are caused to be unbalanced, the configuration adapted for allowing two forces $F_1$, $F_2$ in the focus direction exerted on respective plane surfaces opposite to each other of the lens holder 2 to be unbalanced is not limited to the above-mentioned configuration. For example, the number of windings of the pair of focus coils 20 may be caused to be different from each other to thereby allow magnetic flux densities produced at the respective focus coils 20 to be different from each other, and magnetic forces of magnets 19, 19 opposite to each other of respective focus coils 20, 20 may be caused to be different from each other.

It is to be noted, also in the third embodiment, there may be employed a configuration such that spacings G1 between magnetic pole surfaces of two magnets 19 and coil surface 24 of two focus coils 20 are respectively the same, and there may be also employed configuration such that spacings G2 between magnetic pole surfaces of the two magnets 19 and coil surfaces 34 of the two tracking coils 30 may be respectively the same. In this case, magnitudes of drive currents respectively delivered to the pair of focus coils 20, 20 are caused to be variable (adjustable), thereby making it possible to perform control of tilt angle.

In the third embodiment, also at the optical pick-up 304 in which two object lenses 71, 72 are attached to common lens holder 2, adjustment of tilt angle can be made without increasing the number of parts, and increase in weight of the movable portion resulting from the fact that plural object lenses 71, 72 are used is suppressed. Thus, it is possible to stably perform drive control of the object lenses 71, 72 by less drive current.

The optical disc apparatus using the optical pick-up 304 capable of stably performing drive control of the object lenses 71, 71 by less drive current not only can realize saving of power, but also can precisely perform drive displacement of object lenses 71, 72 in accordance with a focus error signal and a tracking error signal, or a tilt control signal. Thus, improvement in the recording or reproducing characteristic of information signals can be realized.

It is to be noted that while the present invention has been described in accordance with preferred embodiments thereof illustrated in the accompanying drawings and described in detail, it should be understood by those ordinarily skilled in the art that the invention is not limited to embodiments, but various modifications, alternative constructions or equivalents can be implemented without departing from the scope and spirit of the present invention as set forth by appended claims.

The invention claimed is:

1. An optical pick-up comprising:
   a lens holder for supporting at least one object lens;
   a supporting block disposed in a tangential direction perpendicular to a focus direction which is parallel to the optical axis direction of the object lens with a space provided between the supporting block and the lens holder;
   supporting arms for connecting the lens holder and the supporting block to movably support the lens holder in the focus direction and in a tracking direction perpendicular to the tangential direction with respect to the supporting block;
   a pair of focus coils which are attached to the lens holder and supplied with drive current to move the lens holder in the focus direction;
   magnets which are supported by a yoke and face the pair of focus coils respectively; and
   a pair of tracking coils which are so attached to the lens holder as to face the magnets and supplied with drive current to move the lens holder in the tracking direction,
   wherein,
   the pair of focus coils have coil surfaces which are perpendicular to winding axes of the respective focus coils and face the magnets, and are so attached to the lens holder as to face the tangential direction with the object lens put therebetween, the pair of focus coils being shifted in left and right directions respectively away from a virtual axis which is perpendicular to the tracking direction and passes along the optical axis of the object lens, the coil surfaces being directed toward the tangential direction,
   the pair of tracking coils have coil surfaces which are perpendicular to winding axes of the respective tracking coils and face the magnets, and are so attached to the lens holder as to face the tangential direction in parallel to the focus coils with the object lens put therebetween, the pair of tracking coils being shifted in left and right directions respectively away from the virtual axis which is perpendicular to the tracking direction and passes along the optical axis of the object lens, the coil surfaces being directed toward the tangential direction,
   the supporting arms are formed from one supporting arms and the other supporting arms which are disposed at both sides of the virtual axis which is perpendicular to the tracking direction and passes along the optical axis of the object lens, the one supporting arms and the other supporting arms being formed from a pair of supporting arms respectively, which are arranged in parallel to the optical axis direction of the object lens,
   a crossing point of a first virtual axis and a second virtual axis is formed at a point having a same height as a center of drive on which a drive force is exerted, the drive force being produced by interaction of drive current delivered to the respective tracking coils and magnetic flux from the magnets, and is formed at a point having a same height as a center of gravity of the lens holder including the object lens, the focus coils and the tracking coils, the first virtual axis passing through a portion connecting an upper supporting arm of the pair of the one supporting arms, which is positioned upward in the optical axis direction of the object lens, and the lens holder as well as a portion connecting a lower supporting arm of the pair of the other supporting arms, which is positioned downward in the optical axis direction of the object lens, and the lens holder, the second virtual axis passing through a portion connecting a lower supporting arm of the pair of the one supporting arms, which is positioned downward in the optical axis direction of the object lens, and the lens holder as well as a portion connecting an upper supporting arm of the pair of the other supporting arms, which is positioned upward in the optical axis direction of the object lens, and the lens holder.

2. The optical pick-up as set forth in claim 1, wherein the focus coil and the tracking coil are attached to one surface of the lens holder, winding centers of the focus coil and the tracking coil being shifted in the optical axis direction of the object lens supported by the lens holder.

3. The optical pick-up as set forth in claim 1, wherein two object lenses are supported by the lens holder in the tangential direction.

4. The optical pick-up as set forth in claim 1, wherein the drive center on which a drive force is exerted is shifted away from the center of gravity of the lens holder, to which only the object lens is attached, in the optical axis direction of the object lens, the drive force being produced by interaction of drive current delivered to the respective focus coils and magnetic flux from the magnets.

5. The optical pick-up as set forth in claim 1, wherein spacings between the respective magnets, which are so arranged as to face the coil surfaces of the pair of focus coils, and the coil surfaces of the respective focus coils are equal to each other in the tangential direction.

6. The optical pick-up as set forth in claim 1, wherein spacings between the respective magnets, which are so arranged as to face the coil surfaces of the pair of focus coils, and the coil surfaces of the respective focus coils are different from each other in the tangential direction.

7. An optical pick-up comprising:
a lens holder for supporting an object lens;
a supporting block disposed in a tangential direction perpendicular to a focus direction which is parallel to the optical axis direction of the object lens with a space provided between the supporting block and the lens holder;
supporting arms for connecting the lens holder and the supporting block to movably support the lens holder in the focus direction and in a tracking direction perpendicular to the tangential direction with respect to the supporting block;
a pair of focus coils which are attached to the lens holder and supplied with drive current to move the lens holder in the focus direction; and
magnets which are supported by a yoke and face the pair of focus coils respectively,
wherein,
the pair of focus coils have coil surfaces which are perpendicular to winding axes of the respective focus coils and face the magnets, and are so attached to the lens holder as to face the tangential direction with the object lens therebetween, the pair of focus coils being shifted in left and right directions respectively away from a virtual axis which is perpendicular to the tracking direction and passes along the optical axis of the object lens, the coil surfaces being directed toward the tangential direction, the numbers of windings of the pair of focus coils being made different from each other.

8. An optical pick-up comprising:
a lens holder for supporting an object lens;
a supporting block disposed in a tangential direction perpendicular to a focus direction which is parallel to the optical axis direction of the object lens with a space provided between the supporting block and the lens holder;
supporting arms for connecting the lens holder and the supporting block to movably support the lens holder in the focus direction and in a tracking direction perpendicular to the tangential direction with respect to the supporting block;
a pair of focus coils which are attached to the lens holder and supplied with drive current to move the lens holder in the focus direction; and
magnets which are supported by a yoke and face the pair of focus coils respectively,
wherein,
the pair of focus coils have coil surfaces which are perpendicular to winding axes of the respective focus coils and face the magnets, and are so attached to the lens holder as to face the tangential direction with the object lens put therebetween, the pair of focus coils being shifted in left and right directions respectively away from a virtual axis which is perpendicular to the tracking direction and passes along the optical axis of the object lens, the coil surfaces being directed toward the tangential direction, and
a spacing between the respective magnets, which are so arranged as to face the coil surfaces of the pair of focus coils, and a spacing between the coil surface of the focus coil and the magnet are different from each other in the tangential direction.

9. The optical pick-up as set forth in claim 1, wherein two object lenses are supported by the lens holder in the tangential direction.

10. The optical pick-up as set forth in claim 8, wherein a spacing between the respective magnets, which are so arranged as to face the coil surfaces of the pair of focus coils, and a spacing between the coil surface of the focus coil and the magnet are different from each other in the tangential direction.

11. An optical disc apparatus including drive means for holding and rotationally driving an optical disc, and an optical pick-up for irradiating light beams serving to record or reproduce information signals for the optical disc which is rotationally driven by the drive means, and for detecting reflected light beams from the optical disc,
the optical pick-up including:
a lens holder for supporting at least one object lens;
a supporting block disposed in a tangential direction perpendicular to a focus direction which is parallel to the optical axis direction of the object lens with a space provided between the supporting block and the lens holder;
supporting arms for connecting the lens holder and the supporting block to movably support the lens holder in the focus direction and in a tracking direction perpendicular to the tangential direction with respect to the supporting block;
a pair of focus coils which are attached to the lens holder and supplied with drive current to move the lens holder in the focus direction;
magnets which are supported by a yoke and face the pair of focus coils respectively; and
a pair of tracking coils which are so attached to the lens holder as to face the magnets and supplied with drive current to move the lens holder in the tracking direction, wherein,
the pair of focus coils have coil surfaces which are perpendicular to winding axes of the respective focus coils and face the magnets, and are so attached to the lens holder as to face the tangential direction with the object lens put therebetween, the pair of focus coils being shifted in left and right directions respectively away from a virtual axis perpendicular to the tracking direction and passes along the optical axis of the object lens, the coil surfaces being directed toward the tangential direction, the pair of tracking coils have coil surfaces which are perpendicular to winding axes of the respective tracking coils and face the magnets, and are so attached to the lens holder as to face the tangential direction in parallel to the focus coils with the object lens put therebetween, the pair of tracking coils being shifted in left and right directions respectively away from the virtual axis which is perpendicular to the tracking direction and passes along the optical axis of the object lens, the coil surfaces being directed toward the tangential direction, the supporting arms are formed from one supporting arms and the other supporting arms which are disposed at both sides of the virtual axis which is perpendicular to the tracking direction and passes along the optical axis of the object lens, the one supporting arms and the other supporting arms being formed from a pair of supporting arms respectively, which are arranged in parallel to the optical axis direction of the object lens, a crossing point of a first virtual axis and a second virtual axis is formed at a point having a same height as center of drive on which a drive force is exerted, the drive force being produced by interaction of drive current delivered to the respective tracking coils and magnetic flux from the magnets, and is formed at a point having a same height as a center of gravity of the lens holder including the object lens, the focus coils and the tracking coils, the first virtual axis passing through a portion connecting an upper supporting arm of the pair of the one supporting arms, which is positioned upward in the optical axis direction of the object lens, and the lens holder as well as a portion connecting a lower supporting arm of the pair of the other supporting arms, which is positioned downward in the optical axis direction of the optical lens, and the lens holder, the second virtual axis passing through a portion connecting a lower supporting arm of the pair of the one supporting arms, which is positioned downward in the optical axis direction of the object lens, and the lens holder as well as a portion connecting an upper supporting arm of the pair of the other supporting arms, which is positioned upward in the optical direction of the object lens, and the lens holder.

12. The optical disc apparatus as set forth in claim 11, wherein two object lenses are supported by the lens holder in the tangential direction.

13. The optical disc apparatus as set forth in claim 11, wherein a spacing between the respective magnets, which are so arranged as to face the coil surfaces of the pair of focus coils, and a spacing between the coil surface of the focus coil and the magnet are different from each other in the tangential direction.

14. The optical disc apparatus as set forth in claim 11, wherein the numbers of windings of the pair of focus coils is made different from each other.

15. The optical disc apparatus as set forth in claim 11, wherein a spacing between the respective magnets, which are so arranged as to face the coil surfaces of the pair of focus coils, and a spacing between the coil surface of the focus coils and the magnet are equal to each other in the tangential direction, the numbers of windings of the pair of focus coils being made different from each other.

16. An optical disc apparatus including drive means for holding and rotationally driving an optical disc, and an optical pick-up for irradiating light beams serving to record or reproduce information signals for the optical disc which is rotationally driven by the drive means, and for detecting reflected light beams reflected from the optical disc, the optical pick-up comprising:
a lens holder for supporting an object lens;
a supporting block disposed in a tangential direction perpendicular to a focus direction which is parallel to the optical axis direction of the object lens with a space provided between the supporting block and the lens holder;
supporting arms for connecting the lens holder and the supporting block to movably support the lens holder in the focus direction and in a tracking direction perpendicular to the tangential direction with respect to the supporting block;
a pair of focus coils which are attached to the lens holder and supplied with drive current to move the lens holder in the focus direction; and
magnets which are supported by a yoke and face the pair of focus coils respectively, wherein,
the pair of focus coils have coil surfaces which are perpendicular to winding axes of the respective focus coils and face the magnets, and are so attached to the lens holder as to face the tangential direction with the object lens put therebetween, the pair of focus coils being shifted in left and right directions respectively away from a virtual axis which is perpendicular to the tracking direction and passes along the optical axis of the object lens, the coil surfaces being directed toward the tangential direction, and a spacing between the respective magnets, which are so arranged as to face the coil surfaces of the pair of focus coils, and a spacing between the coil surface of the focus coil and the magnet are different from each other in the tangential direction.

17. The optical disc apparatus as set forth in claim 15, including drive means for holding and rotationally driving an optical disc, and an optical pick-up for irradiating light beams serving to record or reproduce information signals for the optical disc which is rotationally driven by the drive means and for detecting reflected light beams reflected from the optical disc, the optical pick-up comprising:
a lens holder for supporting an object lens;
a supporting block disposed in a tangential direction perpendicular to a focus direction which is parallel to the optical axis direction of the object lens with a space provided between the supporting block and the lens holder;
supporting arms for connecting the lens holder and the supporting block to movably support the lens holder in the focus direction and in a tracking direction perpendicular to the tangential direction with respect to the supporting block;

a pair of focus coils which are attached to the lens holder and supplied with drive current to move the lens holder in the focus direction; and magnets which are supported by a yoke and face the pair of focus coils respectively, wherein, the pair of focus coils have coil surfaces which are perpendicular to winding axes of the respective focus coils and face the magnets, and are so attached to the lens holder as to face the tangential direction with the object lens put therebetween, the pair of focus coils being shifted in left and right directions respectively away from a virtual axis which is perpendicular to the tracking direction and passes along the optical axis of the object lens, the coil surfaces being directed toward the tangential direction, the numbers of windings of the pair of focus coils being made different from each other.

* * * * *

UNITED STATES PATENT AND TRADEMARK OFFICE
CERTIFICATE OF CORRECTION

PATENT NO. : 7,221,523 B2  Page 1 of 1
APPLICATION NO. : 10/563159
DATED : May 22, 2007
INVENTOR(S) : Takahiro Miyagi It is certified that error appears in the above-identified patent and that said Letters Patent is hereby corrected as shown below:

Column 1, line 65, change "theses" to --these--.

Column 3, line 41, change "forcus" to --focus--.

Column 4, line 5, change "presentn" to --present--.

Column 9, line 14, change "dose" to --does--.

Column 9, line 23, change "filed" to --field--.

Column 10, line 30, change "pace" to --place--.

Signed and Sealed this

Thirtieth Day of October, 2007

JON W. DUDAS
*Director of the United States Patent and Trademark Office*